United States Patent
Podgorski et al.

(10) Patent No.: US 11,897,816 B2
(45) Date of Patent: Feb. 13, 2024

(54) METHOD FOR MANUFACTURING A CMC PART

(71) Applicants: SAFRAN, Paris (FR); SAFRAN CERAMICS, Le Haillan (FR); SAFRAN AIRCRAFT ENGINES, Paris (FR)

(72) Inventors: Michaël Podgorski, Moissy-Cramayel (FR); Bruno Jacques Gérard Dambrine, Moissy-Cramayel (FR); Emilie Chantal Gisèle Mendez, Moissy-Cramayel (FR); Wen Zhang, Moissy-Cramayel (FR); Yvan Rappart, Moissy-Cramayel (FR); Charles Leleu, Moissy-Cramayel (FR)

(73) Assignees: SAFRAN, Paris (FR); SAFRAN CERAMICS, Le Haillan (FR); SAFRAN AIRCRAFT ENGINES, Paris (FR)

( * ) Notice: Subject to any disclaimer, the term of this patent is extended or adjusted under 35 U.S.C. 154(b) by 715 days.

(21) Appl. No.: 17/054,676

(22) PCT Filed: May 15, 2019

(86) PCT No.: PCT/FR2019/051102
§ 371 (c)(1),
(2) Date: Nov. 11, 2020

(87) PCT Pub. No.: WO2019/220057
PCT Pub. Date: Nov. 21, 2019

(65) Prior Publication Data
US 2021/0078913 A1    Mar. 18, 2021

(30) Foreign Application Priority Data

May 15, 2018  (FR) ........................................ 1854047
May 15, 2018  (FR) ........................................ 1854053

(51) Int. Cl.
*C04B 35/78* (2006.01)
*C04B 41/00* (2006.01)
(Continued)

(52) U.S. Cl.
CPC .......... *C04B 35/565* (2013.01); *C04B 35/185* (2013.01); *C04B 35/573* (2013.01);
(Continued)

(58) Field of Classification Search
CPC .............. C04B 35/78–83; C04B 41/47; C04B 41/5096; F05D 2300/6033
See application file for complete search history.

(56) References Cited

U.S. PATENT DOCUMENTS 5,394,930 A      3/1995  Kennerknecht
2001/0038817 A1* 11/2001  Reiser ................. C04B 41/4521
                                                    264/29.1
(Continued)

FOREIGN PATENT DOCUMENTS

EP    1 593 757 A    11/2005
FR    2 779 425 A1   12/1999
(Continued)

OTHER PUBLICATIONS

International Search Report as issued in International Patent Application No. PCT/FR2019/051102, dated Aug. 28, 2019.
(Continued)

*Primary Examiner* — Erin Snelting
(74) *Attorney, Agent, or Firm* — Pillsbury Winthrop Shaw Pittman LLP (57) ABSTRACT

A process for manufacturing a part made of a ceramic matrix composite material, includes coating an outer surface of a porous preform with a layer of a fugitive material to form a model of the part to be obtained, the fugitive material being wax or resin, the fugitive material layer in the model not
(Continued)

exceeding the highest peak of surface undulations of the preform, and ceramic and/or carbon particles being present in the porosity of the preform, coating the model formed with a ceramic powder composition, heat treating the coated model to remove the fugitive material and form a ceramic shell mold by sintering of the ceramic powder composition, introducing a molten composition including silicon into the shell mold to obtain the part in the shell mold, the molten composition infiltrating the porosity of the preform to form the ceramic matrix, and separating the shell mold from the part obtained.

13 Claims, 9 Drawing Sheets

(51) Int. Cl.
    *C04B 41/45*     (2006.01)
    *C04B 41/47*     (2006.01)
    *C04B 41/50*     (2006.01)
    *C04B 41/52*     (2006.01)
    *C04B 35/80*     (2006.01)
    *C04B 35/565*     (2006.01)
    *C04B 35/185*     (2006.01)
    *C04B 35/583*     (2006.01)
    *C04B 35/584*     (2006.01)
    *F01D 5/28*     (2006.01)
    *C04B 35/573*     (2006.01)

(52) U.S. Cl.
    CPC .......... *C04B 35/583* (2013.01); *C04B 35/584* (2013.01); *C04B 35/78* (2013.01); *C04B 35/80* (2013.01); *C04B 41/009* (2013.01); *C04B 41/459* (2013.01); *C04B 41/47* (2013.01); *C04B 41/5096* (2013.01); *C04B 41/52* (2013.01); *F01D 5/288* (2013.01); *C04B 2235/422* (2013.01); *C04B 2235/5244* (2013.01); *C04B 2235/5248* (2013.01); *C04B 2235/5252* (2013.01); *C04B 2235/6028* (2013.01); *F05D 2260/95* (2013.01); *F05D 2300/6033* (2013.01)

(56) References Cited

U.S. PATENT DOCUMENTS

| | | |
|---|---|---|
| 2012/0171039 A1 | 7/2012 | Huang et al. |
| 2016/0102022 A1 | 4/2016 | Chamberlain et al. |
| 2017/0159459 A1* | 6/2017 | Courcot ................ C04B 35/565 |
| 2017/0326635 A1 | 11/2017 | Bulgrin et al. |

FOREIGN PATENT DOCUMENTS

| | | |
|---|---|---|
| WO | WO 2006/136755 A2 | 12/2006 |
| WO | WO 2014/053751 A1 | 4/2014 |
| WO | WO 2016/001026 A1 | 1/2016 |

OTHER PUBLICATIONS

Pattnaik, S., et al., "Developments in investment casting process—A review," Journal of Materials Processing Technology, vol. 212, No. 11, XP028935921, pp. 2332-2348.

Krenkel, W. (Editor), *Ceramics Matrix Composites: Fiber Reinforced Ceramics and their Applications*, Section 5.2—Processing, (2008), pp. 1, 2, and 114.

* cited by examiner

METHOD FOR MANUFACTURING A CMC PART

CROSS-REFERENCE TO RELATED APPLICATIONS

This application is the U.S. National Stage of PCT/FR2019/051102, filed May 15, 2019, which in turn claims priority to French patent application number 1854053 filed May 15, 2018 and French patent application number 1854047 filed May 15, 2018. The content of these applications are incorporated herein by reference in their entireties.

TECHNICAL FIELD

The present invention relates to a process for manufacturing a ceramic matrix composite (CMC) part using a melt-infiltration step.

PRIOR ART

CMC parts can form the hot parts of gas turbines, such as combustor walls, or turbine rings, turbine nozzles or turbine blades, for aero-engines or industrial turbines.

CMC parts are known to have both good mechanical properties allowing their use for structural elements and the ability to maintain these properties at high temperatures. CMC parts have a fibrous reinforcement of refractory fibers, typically of carbon or ceramic, which is densified by a ceramic matrix, for example silicon carbide (SiC).

It is known that CMC parts can be formed by the melt infiltration technique in which a molten composition comprising silicon is introduced into the porosity of a porous preform.

It may however prove difficult, in this type of technique, to directly obtain a CMC part in the desired shape (so-called net shape part) with a smooth surface finish. A smooth surface finish for a CMC part may be desirable, for example when seeking to improve the aerodynamic performance of the part, for example in the case of a blade.

It is desirable to have a process for obtaining a CMC part directly in the desired shape with a smooth surface finish.

Moreover, under aero-turbine operating conditions, i.e. at high temperatures in an oxidizing and humid atmosphere, CMC parts can be sensitive to corrosion. CMC corrosion can result from the oxidation of SiC to silica which, in the presence of water vapor, volatilizes as silicon hydroxides $Si(OH)_4$. Corrosion leads to a recession of the CMC and affects its lifetime. In order to limit this degradation in operation, it has been considered to form environmental barrier coatings on the surface of CMC parts.

These coatings may include a rare earth silicate layer which is bonded to the underlying CMC material by a silicon bonding layer. The bonding layer improves the bonding of the rare earth silicate layer and forms a protective silica layer, whose low oxygen permeability helps to protect the CMC from oxidation. The rare earth silicate layer, in turn, limits the diffusion of water vapor towards the silica layer formed by oxidation of the silicon and consequently limits the recession of the latter.

Various processes are known to produce a CMC part coated with a bonding layer comprising silicon, prior to the formation of the environmental barrier.

In this respect, mention can be made of the production of silicon bonding layers on a CMC part by vacuum thermal spraying process. In this case, two distinct steps are implemented: the first for forming the CMC part and then the second for forming the silicon bonding layer. The implementation of two separate steps to form the CMC part on the one hand and the silicon bonding coat on the other is not an optimal solution when industrial production is sought.

Developments in the prior art have allowed the production, in a melt infiltration step, of a CMC part coated with a bonding layer comprising silicon.

In this context, it has been proposed to generate an extra thickness of silicon carbide (SiC) on the surface of the porous preform, then to infiltrate this extra thickness and the underlying porous preform with molten silicon.

However, the result is a bonding layer comprising silicon carbide whose presence leads, in a corrosive environment, to a porous and cracked silica layer due to the formation of CO and $CO_2$ species, thus diminishing the protection provided by the bonding layer. It is desirable to have a manufacturing process free of the disadvantages of the solutions of the prior art.

DISCLOSURE OF THE INVENTION

According to a first aspect, the invention relates to a process for manufacturing a part made of ceramic matrix composite material, comprising at least:
  coating an outer surface of a porous preform with a layer of a fugitive material to form a model of the part to be obtained, the fugitive material being a wax or a resin,
  coating the model formed by a ceramic powder composition,
  heat treating the coated model to remove the fugitive material and form a ceramic shell mold by sintering of the ceramic powder composition,
  introducing a molten composition comprising silicon into the shell mold to obtain the part in the shell mold, the molten composition infiltrating the porosity of the porous preform to form the ceramic matrix, and
  separating the shell mold from the part obtained.

The invention advantageously makes it possible to obtain, in a relatively simple manner, a CMC part with a smooth surface directly in the desired shape. Indeed, the use of a wax or a resin makes it possible to fill the surface undulations of the porous preform and confers a smooth surface to the inner wall of the shell mold and thus to the surface of the part obtained. In particular, the invention makes it possible to dispense with machining of the CMC in order to obtain a smooth surface.

In an example embodiment, the ceramic powder composition comprises: a mullite powder, a silicon carbide powder, a silicon nitride powder, a boron nitride powder, or a mixture of such powders.

The choice of such materials advantageously makes it possible to form a shell mold that can be used in the case where the step of infiltration with the molten composition requires the use of particularly high temperatures (>1500° C.) and particularly low pressures (<100 mbar). Moreover, such materials have a high wettability with respect to the molten silicon, thus facilitating the flow of the molten composition into the shell mold.

The ceramic powder composition can be formed from several powder layers each with a different composition. Each of these layers can be formed by a separate powder selected from the above-mentioned list. Thus, it is possible to obtain a multilayer shell mold in which each layer has a different composition. Alternatively, the ceramic powder composition may comprise a single powder selected from the above-mentioned list.

In an example embodiment, the fugitive material layer in the model does not exceed the highest peak of the surface undulations of the porous preform. In particular, the fugitive material layer can reach the same height as the highest peak of the surface undulations of the porous preform.

In an example embodiment, the porous preform is a woven fibrous preform obtained by three-dimensional weaving.

In particular, the porous preform can be partially densified by a ceramic matrix phase.

In an example embodiment, ceramic and/or carbon particles are present in the porosity of the porous preform.

In an example embodiment, the part is a turbomachine part. In particular, the part can be a turbomachine blade or a turbomachine nozzle.

The invention further relates, according to a second aspect, to a process for manufacturing a part made of ceramic matrix composite material coated with a bonding layer comprising silicon, comprising at least:
  coating an outer surface of a porous preform with a layer of a fugitive material to form a model of the coated part to be obtained having the dimensions of the latter,
  coating the model formed with a ceramic powder composition,
  heat treating the coated model to remove the fugitive material and form a ceramic shell mold by sintering of the ceramic powder composition,
  introducing a molten composition comprising silicon into the shell mold to obtain the coated part in the shell mold, the molten composition infiltrating the porosity of the porous preform to form the ceramic matrix and covering the outer surface to form the bonding coat, and
  separating the shell mold from the coated part obtained.

The invention advantageously makes it possible to densify the porous preform by the ceramic matrix, and to form the bonding layer comprising silicon in a single step. Furthermore, the process according to the invention makes it possible to form a bonding layer that gives the underlying CMC part, during operation, good oxidation resistance due to reduced cracking of this bonding layer.

In an example embodiment, the ceramic powder composition comprises: a mullite powder, a silicon carbide powder, a silicon nitride powder, a boron nitride powder, or a mixture of such powders.

The choice of such materials advantageously makes it possible to form a shell mold that can be used in the case where the step of infiltration with the molten composition requires the use of particularly high temperatures (>1500° C.) and particularly low pressures (<100 mbar). Moreover, such materials have a high wettability with respect to the molten silicon, thus facilitating the flow of the molten composition into the shell mold.

The ceramic powder composition can be formed from several powder layers each with a different composition. Each of these layers can be formed by a separate powder selected from the above-mentioned list. Thus, it is possible to obtain a multilayer shell mold in which each layer has a different composition. Alternatively, the ceramic powder composition may comprise a single powder selected from the above-mentioned list.

In an example embodiment, the thickness of the fugitive material layer in the model is greater than or equal to 10 µm, this thickness being measured at and from the level of the highest peak of the surface undulations of the porous preform.

In an example embodiment, the fugitive material is a wax or a resin.

The choice of such a fugitive material advantageously makes it possible to obtain a particularly smooth surface finish for the inner wall of the shell mold and thus for the bonding layer obtained.

In an example embodiment, the porous preform is a woven fibrous preform obtained by three-dimensional weaving.

In an example embodiment, ceramic and/or carbon particles are present in the porosity of the porous preform.

In particular, the porous preform can be partially densified by a ceramic matrix phase.

In an example embodiment, the part is a turbomachine part. In particular, the part can be a turbomachine blade or a turbomachine nozzle.

The invention also relates to a process for manufacturing a multilayer structure comprising at least:
  manufacturing the part coated with the bonding layer by using a process as described above, and
  forming a protective coating on the bonding coat.

In an example embodiment, the protective coating is an environmental barrier coating.

BRIEF DESCRIPTION OF THE DRAWINGS

Other features and advantages of the invention will emerge from the following description, given on a non-limiting basis, with reference to the appended drawings, wherein.

DESCRIPTION OF THE EMBODIMENTS

Figure 1:
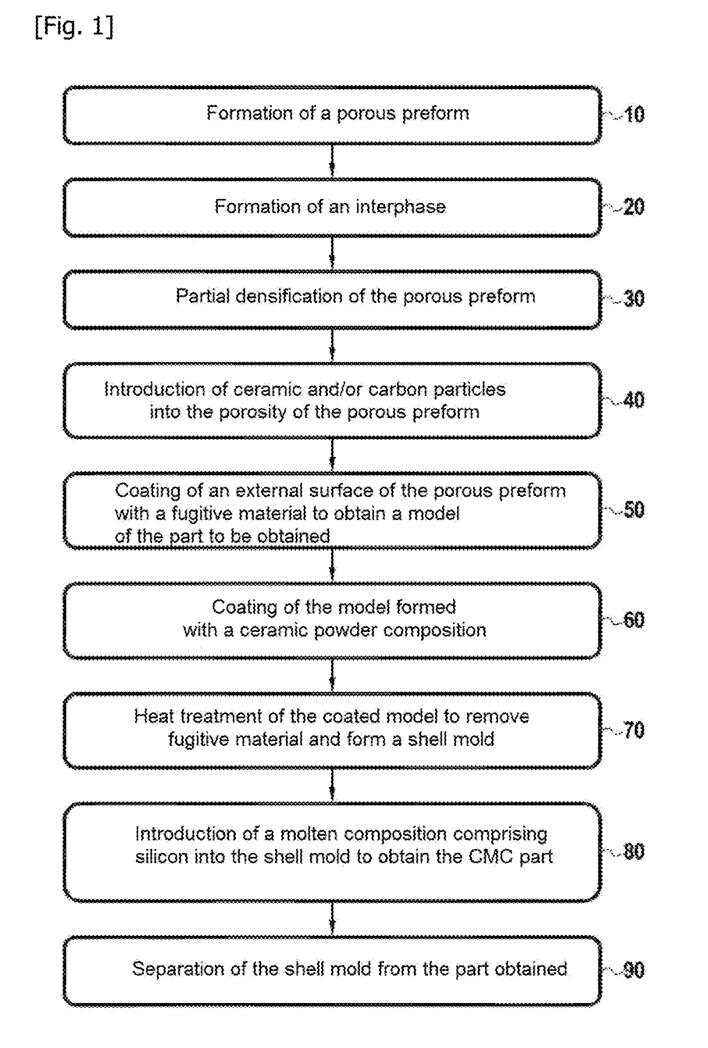
FIG. 1 is a flowchart showing different successive steps of an example process according to the first aspect of the invention, FIG. 2 schematically illustrates a step of the process of FIG. 1, FIG. 3 schematically illustrates a step of the process of FIG. 1, FIG. 4 schematically illustrates a step of the process of FIG. 1, FIG. 5 schematically illustrates a step of the process of FIG. 1, FIG. 6 schematically illustrates a step of the process of FIG. 1, FIG. 7 schematically illustrates a step of the process of FIG. 1, FIG. 8 schematically illustrates a step of the process of FIG. 1.

The succession of different steps of an example process according to the invention is shown in FIG. 1 which will be detailed below.

A porous preform is first obtained (step 10). The porous preform can be a porous fibrous preform. In this case, it is intended to form a fibrous reinforcement for the part to be obtained.

In step 10, a porous fibrous preform can be obtained from at least one textile operation. The porous fibrous preform can comprise ceramic yarns, carbon yarns or a mixture of such yarns. In particular, the porous fibrous preform may comprise silicon carbide yarns. Silicon carbide yarns may have an oxygen content of less than or equal to 1 atomic percent. For example, yarns supplied under the name "Hi-Nicalon-S" by the Japanese company NGS can be used.

The porous fibrous preform can be made in one piece by three-dimensional weaving or from a plurality of two-dimensional fibrous layers or from several one-dimensional fabric layers.

"Three-dimensional weaving" or "3D weaving" refers to a method of weaving in which at least some of the warp threads bind weft threads over several weft layers. A reversal of the roles between warp and weft is possible in the present text and must be considered as covered also by the claims.

The porous fibrous preform can, for example, have a multi-satin weave, i.e. it can be a fabric obtained by three-dimensional weaving with several layers of weft threads, the basic weave of each layer being equivalent to a conventional satin-type weave but with certain points in the weave that bind the layers of weft threads together. Alternatively, the porous fibrous preform may have an interlock weave. "Interlock weave or fabric" means a 3D weave in which each layer of warp yarns links several layers of weft yarns with all the yarns of the same warp column having the same movement in the plane of the weave. Different weaving methods that can be used to form the porous fibrous preform are described in WO 2006/136755.

It is also possible to start from fibrous textures such as two-dimensional fabrics or unidirectional webs and to obtain the porous fibrous preform by draping such fibrous textures on a form. These textures can possibly be bonded together, for example by stitching or implantation of yarns to form the porous fibrous preform.

Once the porous fibrous preform is obtained, a step of surface treatment of the yarns can be carried out, prior to the formation of the interphase, in order to eliminate the sizing present on the yarns.

An interphase is then formed on the yarns (step 20). The interphase can be deposited in contact with the yarns. The interphase can be monolayer or multilayer. The interphase may comprise at least one layer of pyrolytic carbon (PyC), boron nitride (BN), silicon-doped boron nitride (BN(Si), with silicon in a mass proportion comprised between 5% and 40%, the remainder being boron nitride) or boron-doped carbon (BC, with boron in an atomic proportion comprised between 5% and 20%, the remainder being carbon).

The interphase has here a function of embrittlement relief of the composite material which promotes the deflection of possible cracks reaching the interphase after having propagated in the matrix, preventing or delaying the rupture of yarns by such cracks.

The interphase thickness can for example be greater than or equal to 10 nm, for example be comprised between 10 nm and 1000 nm, or even between 10 nm and 100 nm. After formation of the interphase, the fibrous preform remains porous, with only a minor portion of the initial accessible porosity being filled by the interphase.

A partial densification of the porous fibrous preform is then carried out (step 30). A ceramic matrix phase is formed in the porosity of the porous fibrous preform. The ceramic matrix phase is formed here on the interphase. The ceramic matrix phase can be formed in contact with the interphase. The thickness of the ceramic matrix phase can be at least equal to 500 nm, for example to 1 µm. The ceramic matrix phase can be made of silicon carbide. The ceramic matrix phase can be formed by chemical vapor infiltration (CVI).

The ceramic matrix phase constitutes a barrier to the liquid silicon used during the melt infiltration step. The ceramic matrix phase formed during step 30 partially densifies the porous fibrous preform. A residual porosity remains in the porous fibrous preform after formation of this ceramic matrix phase.

Ceramic and/or carbon particles can then be introduced into the porosity of the porous fibrous preform (step 40). The ceramic and/or carbon particles can be introduced, in a manner known per se, by liquid means, for example by injecting a slip into the porosity of the porous preform. The average size (D50) of the ceramic and/or carbon particles can be less than or equal to 5 µm, or even to 1 µm.

The scope of the invention is not exceeded when steps 20 to 40 are not carried out. It is thus possible to use a porous preform formed of a compact block of particles (non-fibrous preform), and obtain the composite material by infiltration of this porous preform with the molten composition.

The performance of steps 50 to 90 shown in FIG. 1 in conjunction with FIGS. 2 to 8 will now be described for the case of a porous fibrous preform 100. It is understood that these steps could also be applied in the context of a porous preform formed from a compact block of particles.

Figure 2:
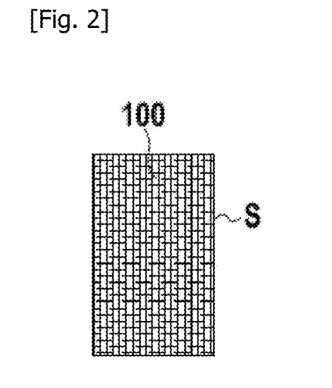

FIG. 2 shows the porous fibrous preform 100 before formation of the model. This porous fibrous preform 100 can be obtained as described above. The porous fibrous preform 100 has an outer surface S.

Figure 3:
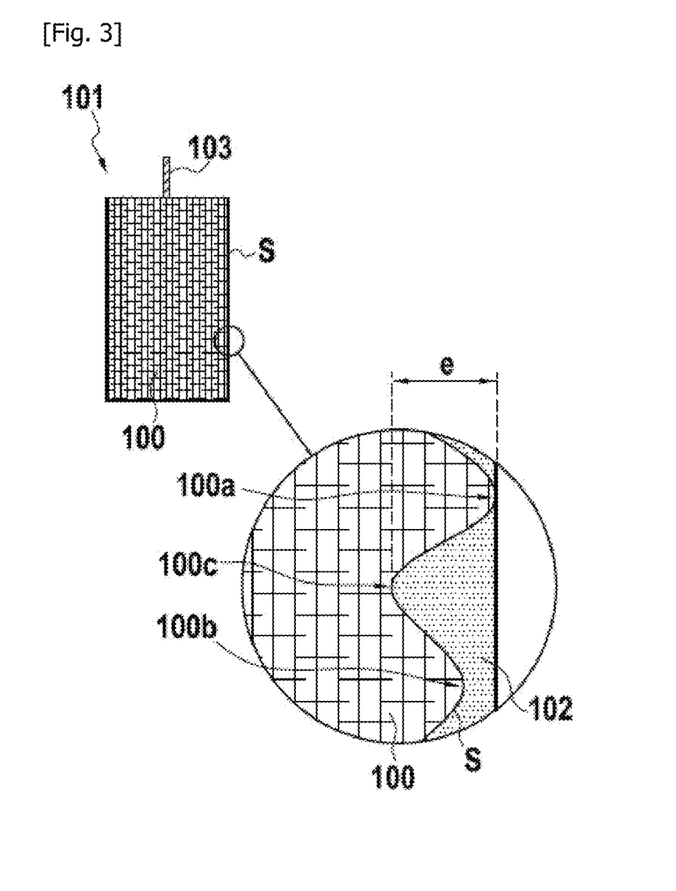

FIG. 3 shows how a model 101 is obtained by applying a fugitive material 102 to the outer surface S of the porous fibrous preform 100 (step 50). In the example shown, the fugitive material 102 is applied to substantially the entire outer surface S of the porous preform 100. Alternatively, the fugitive material can be applied to only a portion of the outer surface of the porous preform. The fugitive material 102 is a wax or a resin. The fugitive material 102 may not infiltrate the porosity of the fibrous preform 100. The fugitive material 102 can for example be polyvinyl alcohol (PVA), polyvinylpyrrolidone (PVP) or polyethylene glycol (PEG). As shown in FIG. 3, the porous preform 100 has surface undulations with alternating peaks 100a and 100b and troughs 100c. The fugitive material layer 102 may not exceed the highest peak 100a of the surface undulations of the porous preform 100. In the example shown, the fugitive material layer 102 is at the same height as the highest peak 100a of the surface undulations and fills the whole of the surface undulations of the porous preform 100.

The fugitive material layer 102 may have a thickness $\underline{e}$ less than or equal to 150 µm, for example less than or equal to 50 µm, for example comprised between 10 µm and 50 µm, this thickness being measured at and from the lowest trough 100c of the surface undulations of the porous preform.

The fugitive material 102 can be applied to the outer surface S by dip-coating technique or by injection into a mold with a hollow cavity around the area to be coated.

The fugitive material 102 can be applied in contact with the outer surface S. A portion 103 of fugitive material can be formed to allow the formation of an injection port in the shell mold, as will be described below.

Figure 4:
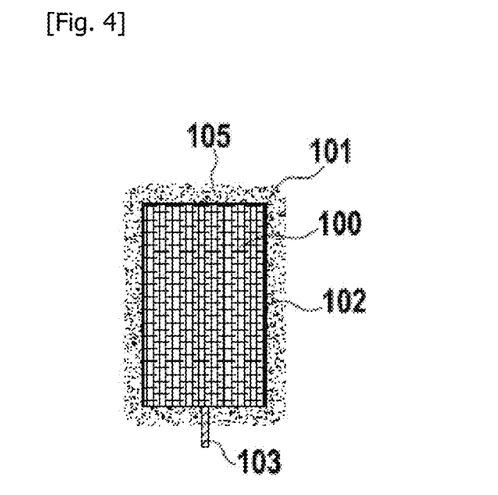

The resulting model 101 is then coated with a ceramic powder composition 105 (FIG. 4, step 60). The ceramic powder composition 105 comprises one or more ceramic powder(s). The ceramic powder composition 105 can be applied in contact with the fugitive material 102. The portion 103 protrudes from the coating formed by the ceramic powder composition 105 so that an injection port can be provided in the shell mold.

The technique used to apply the particles of the ceramic powder composition 105 around the fugitive material 102, as well as the subsequent formation of the shell mold, correspond to techniques known per se in the context of lost-wax casting processes.

For example, the model 101 can be dipped in a slip containing ceramic powder 105, for example in colloidal form. The liquid medium of the slip can be aqueous or organic.

A sandblasting operation can then be carried out during which sand is projected onto the dip-coated model 101. The product thus obtained is then dried. The successive steps of dip-coating and sandblasting are usually repeated several times until a sufficient thickness for the shell mold wall is obtained. In particular, the model can be successively dipped in slips each having a distinct ceramic powder, in order to form a multilayer shell mold.

The ceramic powder composition 105 may comprise a mullite powder, a silicon carbide powder, a silicon nitride powder, a boron nitride powder, or a mixture of such powders. As mentioned above, the ceramic powder composition can be formed from several powder layers each having a different composition. Each of these layers can be formed by a separate powder selected from the above-mentioned list. Alternatively, the ceramic powder composition may comprise a single powder selected from the above-mentioned list.

The average particle size of the ceramic powder composition (size D50) can for example be comprised between 1 μm and 50 μm, for example between 5 μm and 30 μm, for example between 10 μm and 20 μm.

Figure 5:
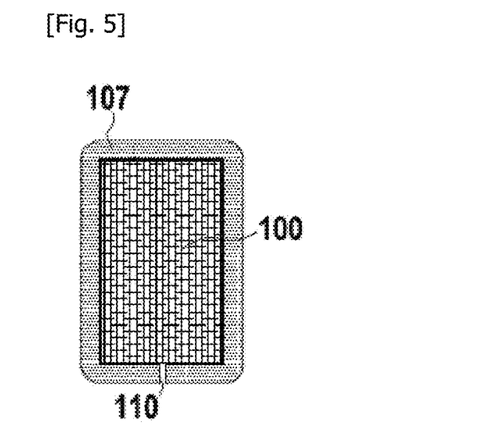

The coated model is then subjected to a heat treatment (step 70 and FIG. 5). The heat treatment removes the fugitive material 102 on the one hand and sinters the ceramic powder composition 105 on the other.

After the heat treatment, a shell mold 107 surrounding the porous preform 100 is obtained. The shell mold 107 has a port 110 through which the molten composition is intended to be introduced.

Figure 6:
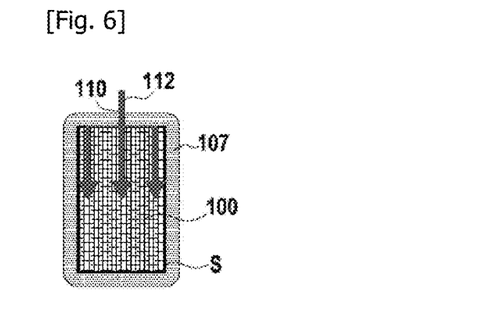

A molten composition 112 comprising silicon is then introduced into the shell mold 107 through the port 110 (FIG. 6, step 80). A melt-infiltration technique is used here. The shell mold 107 is non-reactive with respect to the molten composition 112, and more generally is not affected when the molten composition 112 is introduced.

The introduction of the molten composition 112 is carried out under vacuum. The pressure imposed during this step may be less than or equal to 100 mbar.

The introduction of the molten composition 112 can be carried out at a temperature greater than 1414° C. (silicon melting temperature), preferably greater than or equal to 1420° C.

Figure 7:
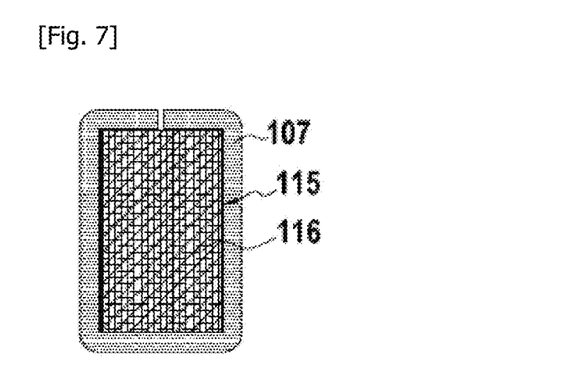

The arrows in FIG. 6 show schematically the path of the molten composition 112. The preform 100 is held in position in the shell mold 107 during the introduction of molten composition 112 by pressing the peaks of the surface undulations of this preform 100 onto the shell mold 107. As shown, the molten composition 112 infiltrates the internal porosity of the porous preform 100 to form a ceramic matrix 116 densifying this preform. A ceramic matrix 116 comprising silicon carbide can be formed. This matrix can be formed either reactively when the porous preform is loaded with carbon particles, or non-reactively. A CMC part 115 is thus obtained (FIG. 7). The part obtained takes on the shape of the mold and in particular its surface finish. A CMC part with a smooth surface is thus obtained without having to machine the CMC.

The molten composition 112 introduced can correspond to a molten silicon alone or to a silicon alloy in the molten state which further contains one or more other elements such as titanium, molybdenum, boron, iron or niobium. The silicon mass content in the molten composition may be greater than or equal to 50%, or even to 90%.

Figure 8:
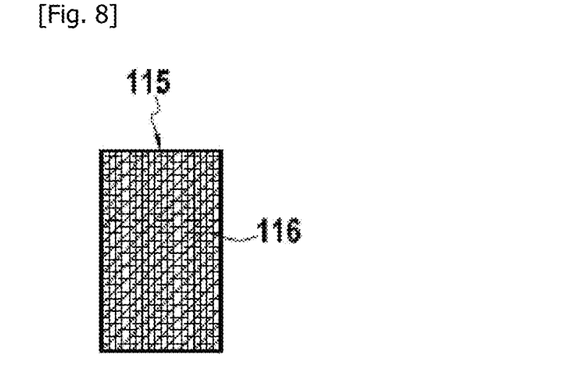

The part 115 is then separated from the shell mold 107, by a release operation, i.e. by breaking the shell mold 107, in a way that is classic to what is done in the lost-wax casting process.

Figure 9:
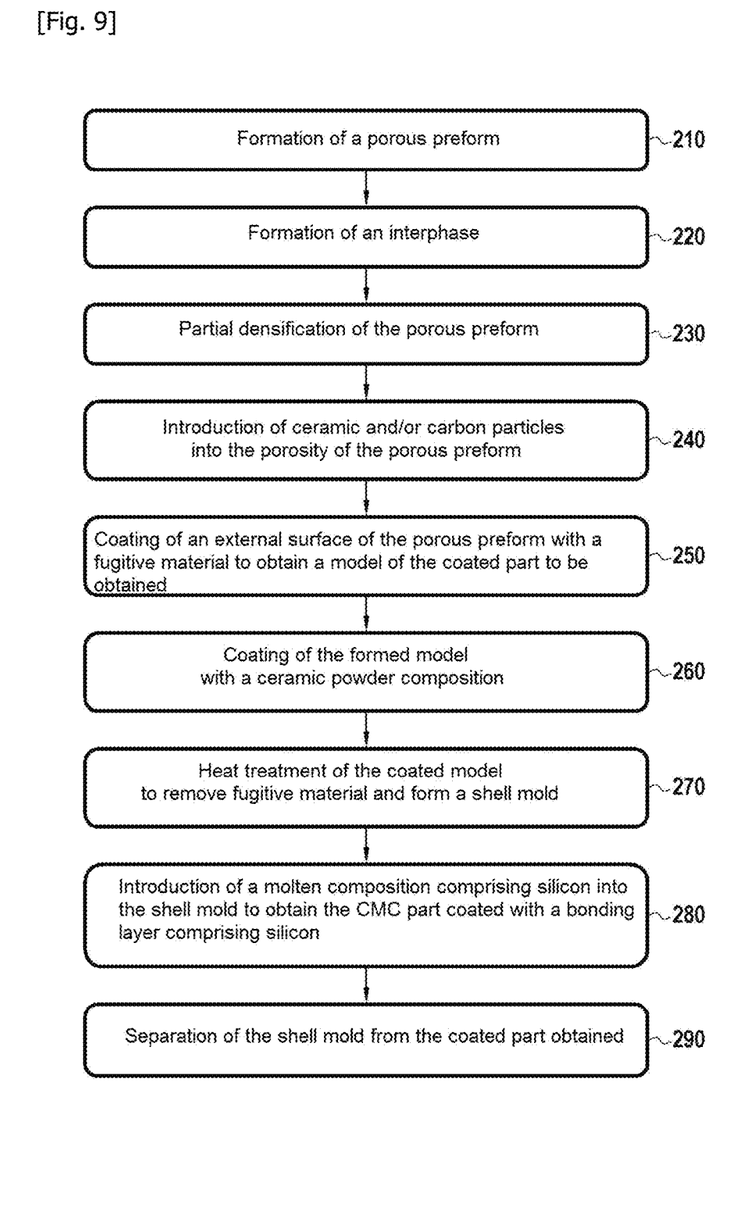
FIG. 9 is a flowchart showing different successive steps of an example process according to the second aspect of the invention, FIG. 10 schematically illustrates a step of the process of FIG. 9, FIG. 11 schematically illustrates a step of the process of FIG. 9, FIG. 12 schematically illustrates a step of the process of FIG. 9, FIG. 13 schematically illustrates a step of the process of FIG. 9, FIG. 14 schematically illustrates a step of the process of FIG. 9, FIG. 15 schematically illustrates a step of the process of FIG. 9, FIG. 16 schematically illustrates a step of the process of FIG. 9, FIG. 17 schematically illustrates a step of the process of FIG. 9, FIG. 18 schematically illustrates the introduction of the molten composition into the shell mold in the context of a variant process according to the second aspect of the invention.

The succession of different steps in an example process according to a second aspect of the invention is shown in FIG. 9 which will be detailed below.

A porous preform is first obtained (step 210). The porous preform can be a porous fibrous preform. In this case, it is intended to form a fibrous reinforcement for the coated part to be obtained.

During step 210, a porous fibrous preform can be obtained from at least one textile operation. The porous fibrous preform can comprise ceramic yarns, carbon yarns or a mixture of such yarns. In particular, the porous fibrous preform may comprise silicon carbide yarns. The silicon carbide yarns may have an oxygen content less than or equal to 1 atomic percent. For example, yarns supplied under the name "Hi-Nicalon-S" by the Japanese company NGS can be used.

The porous fibrous preform can be made in one piece by three-dimensional weaving or from a plurality of two-dimensional fibrous layers or from several one-dimensional fabric layers.

The porous fibrous preform can, for example, have a multi-satin weave, i.e. it can be a fabric obtained by three-dimensional weaving with several layers of weft threads, the basic weave of each layer being equivalent to a conventional satin-type weave, but with certain points in the weave that bind the layers of weft threads together. Alternatively, the porous fibrous preform may have an interlock weave. Different weaving methods that can be used to form the porous fibrous preform are described in WO 2006/136755.

It is also possible to start from fibrous textures such as two-dimensional fabrics or unidirectional webs and obtain the porous fibrous preform by draping such fibrous textures on a form. These textures can possibly be bonded together, for example by stitching or implantation of yarns to form the porous fibrous preform.

Once the porous fibrous preform is obtained, a step of surface treatment of the yarns can be carried out, prior to the formation of the interphase, in order to eliminate the sizing present on the yarns.

An interphase is then formed on the yarns (step 220). The interphase can be deposited in contact with the yarns. The interphase can be monolayer or multilayer. The interphase may comprise at least one layer of pyrolytic carbon (PyC), boron nitride (BN), silicon-doped boron nitride (BN(Si), with silicon in a mass proportion comprised between 5% and 40%, the remainder being boron nitride) or boron-doped carbon (BC, with boron in an atomic proportion comprised between 5% and 20%, the remainder being carbon).

The interphase has here a function of embrittlement relief of the composite material which promotes the deflection of possible cracks reaching the interphase after having propagated in the matrix, preventing or delaying the rupture of yarns by such cracks.

The thickness of the interphase can for example be greater than or equal to 10 nm, for example be comprised between 10 nm and 1000 nm, or even between 10 nm and 100 nm. After formation of the interphase, the fibrous preform remains porous, with only a minor portion of the initial accessible porosity being filled by the interphase.

A partial densification of the porous fibrous preform is then carried out (step 230). A ceramic matrix phase is formed in the porosity of the porous fibrous preform. The ceramic matrix phase is formed here on the interphase. The ceramic matrix phase can be formed in contact with the interphase. The thickness of the ceramic matrix phase can be at least equal to 500 nm, for example to 1 µm. The ceramic matrix phase can be made of silicon carbide. The ceramic matrix phase can be formed by chemical vapor infiltration (CVI).

The ceramic matrix phase provides a barrier to the liquid silicon used during the melt infiltration step. The ceramic matrix phase formed during step 230 partially densifies the porous fibrous preform. A residual porosity remains in the porous fibrous preform after formation of this ceramic matrix phase.

Ceramic and/or carbon particles can then be introduced into the porosity of the porous fibrous preform (step 240). The ceramic and/or carbon particles can be introduced, in a manner known per se, by liquid means, for example by injecting a slip into the porosity of the porous preform. The average size (D50) of the ceramic and/or carbon particles can be less than or equal to 5 µm, or even to 1 µm.

The scope of the invention is not exceeded when steps 220 to 240 are not carried out. It is thus possible to use a porous preform formed of a compact block of particles (non-fibrous preform), and obtain the composite material by infiltration of this porous preform with the molten composition.

The performance of steps 250 to 290 shown in FIG. 9 will now be described in relation to FIGS. 10 to 17 for the case of a porous fibrous preform 100. It is understood that these steps could also be applied in the context of a porous preform formed from a compact block of particles.

Figure 10:
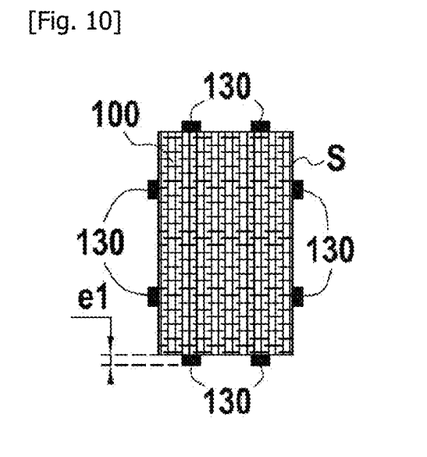

FIG. 10 shows the porous fibrous preform 100 before formation of the model. This porous fibrous preform 100 can be obtained as described above. The porous fibrous preform 100 has an outer surface S. In this example, the porous preform 100 has on its outer surface S a plurality of retaining elements 130 that are intended to ensure that the preform 100 is held in position during the subsequent step of introducing the molten composition 112 into the shell mold 107 (see FIG. 14). The retaining elements 130 form protruding reliefs extending from the outer surface S. The retaining elements 130 may comprise silicon. In particular, the retaining elements 130 may have the same composition as the molten composition 112. The retaining elements 130 can be uniformly distributed on the outer surface S. The retaining elements 130 can be bonded to the outer surface S of the preform 100 with a bonding composition. The bonding composition can be selected from: preceramic resins, such as polycarbosilane or polycarbosilazane resins, silicones or binders, such as polyvinyl alcohol (PVA), polyethylene glycol (PEG), or polyvinylpyrrolidone (PVP). The use of retaining elements 130 is not mandatory, as will be described below in connection with FIG. 18.

Figure 11:
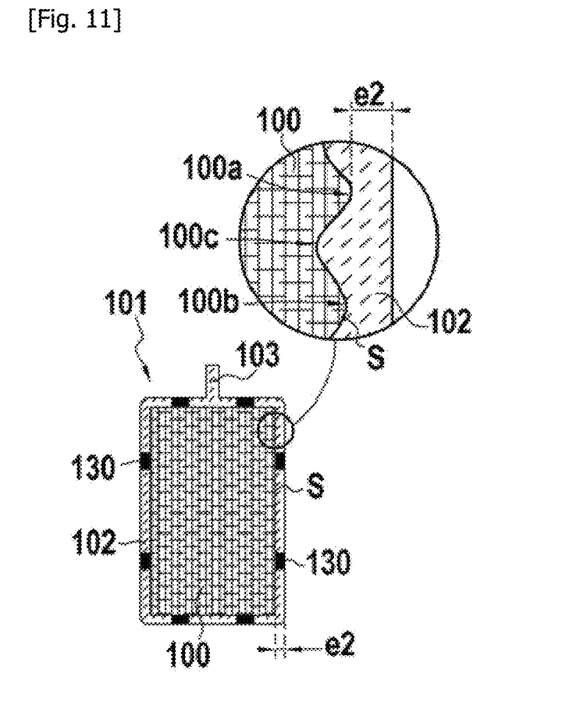

FIG. 11 shows how a model 101 is obtained by applying a fugitive material 102 to the outer surface S of the porous fibrous preform 100 (step 250). In the example shown, the fugitive material 102 is applied to substantially the entire outer surface S of the porous preform 100. Alternatively, the fugitive material may be applied to only a portion of the outer surface of the porous preform, as in the case of FIG. 18. The fugitive material 102 can be a wax or a resin. The fugitive material 102 may not infiltrate the porosity of the fibrous preform 100. The fugitive material 102 may for example be polyvinyl alcohol (PVA), polyethylene glycol (PEG) or polyvinylpyrrolidone (PVP). The fugitive material 102 can be applied around the retaining elements 130. The fugitive material 102 can be applied between the retaining elements 130. The thickness $e_1$ of the retaining elements 130 may be greater than or equal to the thickness $e_2$ of the fugitive material 102 in the model 101. In the example shown, the thickness $e_1$ of the retaining elements 130 is approximately equal to the thickness $e_2$ of the fugitive material 102. Furthermore, the porous preform 100 has surface undulations with alternating peaks 100a and 100b and troughs 100c. The fugitive material layer 102 may cover the highest peak 100a of the surface undulations of the porous preform 100 and have a thickness $e_2$, measured at this peak 100a, greater than or equal to 10 µm, for example to 25 µm, and for example comprised between 25 µm and 150 µm.

The fugitive material 102 can be applied to the outer surface S by dip-coating or by injection into a mold with a hollow cavity around the area to be coated.

The fugitive material 102 can be applied in contact with the outer surface S. A portion 103 of fugitive material can be formed to allow the formation of an injection port in the shell mold, as described below.

The model 101 thus formed has the dimensions of the coated part to be obtained. In particular, the thickness $e_2$ of the fugitive material 102 corresponds to the thickness $e_2$ of the silicon-containing bonding layer to be obtained.

Figure 12:
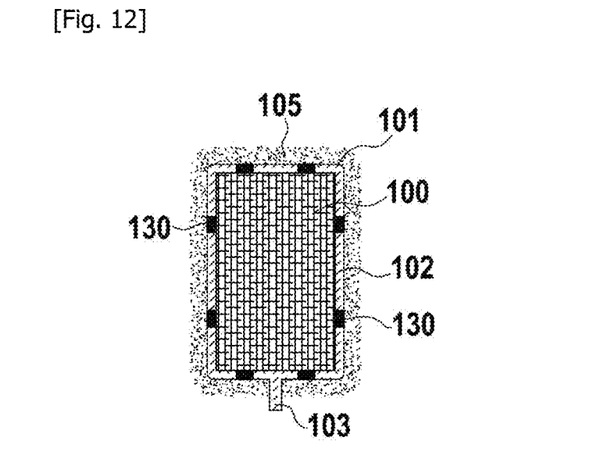

The model 101 thus obtained is then coated with a ceramic powder composition 105 (FIG. 12, step 260). The ceramic powder composition 105 comprises one or more ceramic powder(s). The ceramic powder composition 105 can be applied in contact with the fugitive material 102. The portion 103 protrudes from the coating formed by the ceramic powder composition 105 so that an injection port can be provided in the shell mold.

The technique used to apply the particles of the ceramic powder composition 105 around the fugitive material 102, as well as the subsequent formation of the shell mold, correspond to techniques known per se in the context of lost-wax casting processes.

For example, the model 101 can be dipped in a slip containing a ceramic powder, for example in colloidal form. The liquid medium of the slip can be aqueous or organic.

A sandblasting operation can then be carried out during which sand is projected onto the dip-coated model 101. The product thus obtained is then dried. The successive steps of dip-coating and sandblasting are usually repeated several times until a sufficient thickness for the shell mold wall is obtained. In particular, the model can be successively dipped in slips each having a distinct ceramic powder, to form a multilayer shell mold.

The ceramic powder composition 105 may comprise a mullite powder, a silicon carbide powder, a silicon nitride powder, a boron nitride powder, or a mixture of such powders. As mentioned above, the ceramic powder composition can be formed from several powder layers each having a different composition. Each of these layers can be formed by a separate powder selected from the above-mentioned list. Alternatively, the ceramic powder composition may comprise a single powder selected from the above-mentioned list.

The average particle size of the ceramic powder composition (size D50) can for example be comprised between 1 µm and 50 µm, for example between 5 µm and 30 µm, for example between 10 µm and 20 µm.

Figure 13:
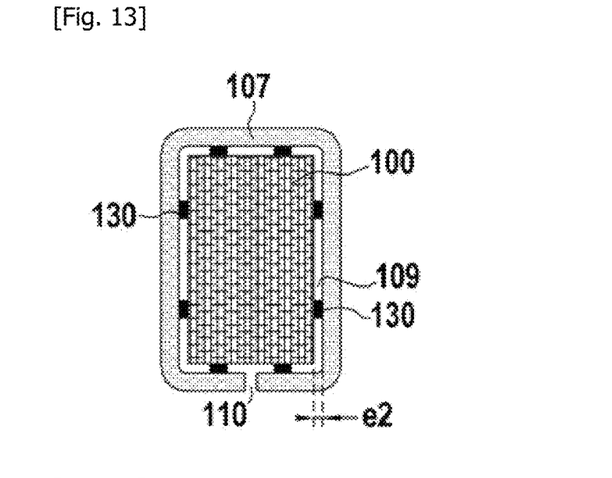

The coated model is then subjected to a heat treatment (step 270 and FIG. 13). The heat treatment removes the fugitive material 102 on the one hand and sinters the ceramic powder composition 105 on the other.

After the heat treatment, a shell mold 107 surrounding the porous preform 100 is obtained. In the example shown, the retaining elements 130 are supported on the inner wall of the shell mold 107 to hold the preform 100 in position. The shell mold 107 has a port 110 through which the molten composition is to be introduced. An internal space 109 is defined between the porous preform 100 and the shell mold 107. The thickness $e_2$ of this internal space 109 corresponds here to the thickness $e_2$ of the fugitive material layer 102 previously applied, as well as to the thickness $e_2$ of the bonding layer to be obtained. The internal space 109 can extend around the porous preform 100, as shown. The internal space 109 can be opposite each side of the preform 100, as shown. In a variant, the internal space faces only one side of the preform, only this side being intended to be coated with the bonding coat (see FIG. 18).

Figure 14:
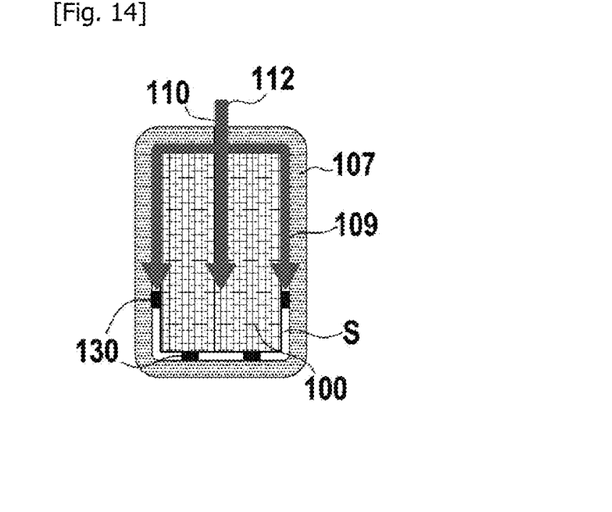

A molten composition 112 comprising silicon is then introduced into the shell mold 107 through the port 110 (FIG. 14, step 280). A melt-infiltration technique is used here. The shell mold 107 is non-reactive with respect to the molten composition 112, and more generally is not affected when the molten composition 112 is introduced.

The introduction of the molten composition 112 is carried out under vacuum. The pressure imposed during this step may be less than or equal to 100 mbar.

The introduction of the molten composition 112 can be carried out at a temperature greater than 1414° C. (silicon melting temperature), preferably greater than or equal to 1420° C.

Figure 15:
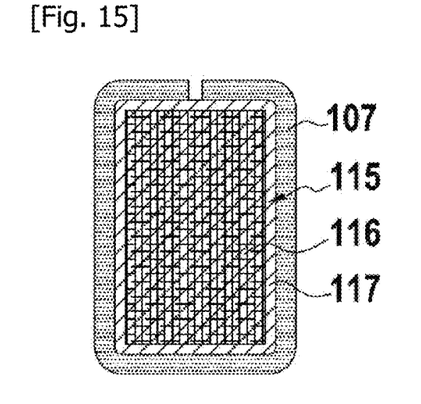

The arrows in FIG. 14 show schematically the path of the molten composition 112. The retaining elements 130 are used to hold the preform 100 in position during the introduction of the molten composition 112. As shown, the molten composition 112 infiltrates the internal porosity of the porous preform 100 to form a ceramic matrix 116 densifying this preform. A ceramic matrix 116 comprising silicon carbide can be formed. This matrix can be formed either reactively when the porous preform is loaded with carbon particles, or non-reactively. The result is a CMC part 115 (FIG. 15).

In addition, molten composition 112 is introduced into the internal space 109 to form bonding layer 117 comprising silicon. Upon contact with the molten composition 112, the retaining elements 130 can melt and be incorporated into the formed bonding layer 117. This bonding layer 117 covers the CMC part 115 (FIG. 15). The resulting bonding coat 117 is advantageously free of carbon, in particular of SiC, so as not to negatively affect its protective capacity in oxidizing environments.

The molten composition 112 introduced can be molten silicon alone or a silicon alloy in the molten state which further contains one or more other elements such as titanium, molybdenum, boron, iron or niobium. The silicon mass content in the molten composition may be greater than or equal to 50%, or even to 90%.

Figure 16:
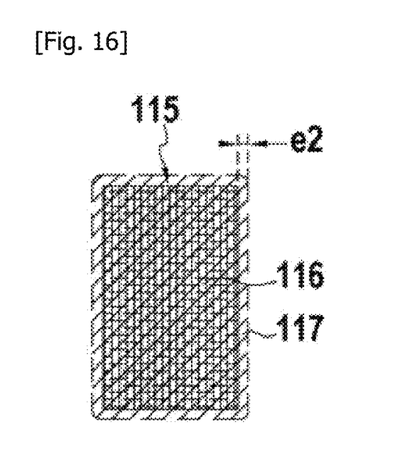
Figure 17:
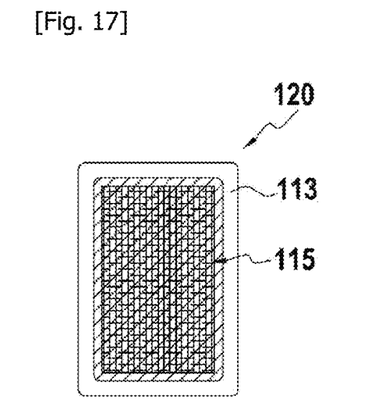

The coated part 115 is then separated from the shell mold 107, by a release operation, i.e. by breaking the shell mold 107, in a manner similar to what is done in the lost-wax casting process.

The process thus made it possible to form in a single step a CMC part 115 coated with a bonding layer 117 comprising silicon.

An environmental barrier 113 can then be formed on bonding coat 117, in a manner known per se. A multilayer structure 120 is then obtained (FIG. 17), which is for example intended for use in a turbomachine. The environmental barrier 113 can, in a manner known per se, comprise at least one layer comprising a rare earth silicate. Alternatively, it is possible to form another type of protective coating such as a thermal barrier for example.

Figure 18:
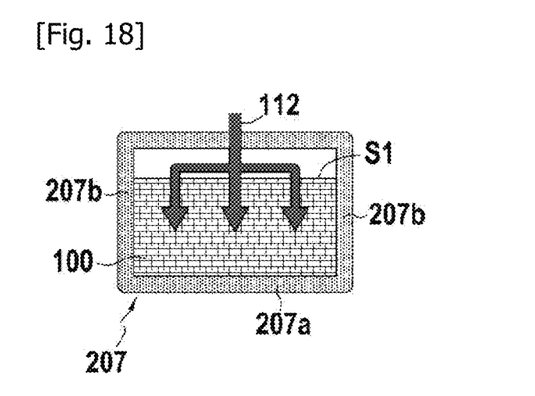

A variant corresponding to a case where the fugitive material was deposited on only part of the outer surface of the porous preform 100 is shown in FIG. 18. FIG. 18 illustrates the stage of introduction of the molten composition 112 into the shell mold 207. In this case, the fugitive material has been deposited on only a part of the outer surface, this part being indicated by the reference S1 in FIG. 10.

In contrast to the example shown in connection with FIGS. 11 to 17, the example of FIG. 18 does not implement any added elements 130 to maintain the preform 100 during the introduction of the molten composition 112. In this variant, the shell mold 207 is used to hold the preform 100 in position. The shell mold 207 is in fact supported by the preform 100. The shell mold 207 rests on the preform 100 on the portion of the outer surface of the preform 100 that has not been coated with the fugitive material. As shown, the shell mold 207 may include a support wall 207*a* carrying the preform 100 and side walls 207*b*. The side walls 207*b* are supported on the preform 100 and the preform 100 is located between the side walls 207*b*.

The expression "comprised between . . . and . . . " should be understood as including the bounds.

The invention claimed is:

1. A process for manufacturing a part made of a ceramic matrix composite material, comprising:
    coating an outer surface of a porous preform with a layer of a fugitive material to form a model of the part to be obtained, the fugitive material being a wax or a resin, the fugitive material layer in the model not exceeding a highest peak of surface undulations of the porous preform, and ceramic and/or carbon particles being present in the porosity of the porous preform,
    coating the model formed with a ceramic powder composition, heat treating the coated model to remove the fugitive material and form a ceramic shell mold by sintering of the ceramic powder composition, introducing a molten composition comprising silicon into the shell mold to obtain the part in the shell mold, the molten composition infiltrating the porosity of the porous preform to form the ceramic matrix, and separating the shell mold from the part obtained.

2. The process as claimed in claim 1, wherein the ceramic powder composition comprises: a mullite powder, a silicon carbide powder, a silicon nitride powder, a boron nitride powder, or a mixture thereof.

3. The process as claimed in claim 1, wherein the porous preform is a woven fibrous preform obtained by three-dimensional weaving.

4. The process as claimed in claim 3, wherein the porous preform is partially densified by a ceramic matrix phase.

5. The process as claimed in claim 1, wherein the part is a turbomachine part.

6. A process for manufacturing a multilayer structure comprising:

manufacturing a part made of ceramic matrix composite material coated with a bonding layer comprising silicon by implementing a process comprising:

coating an outer surface of a porous preform with a layer of a fugitive material in order to form a model of the coated part to be obtained having dimensions of the coated part, coating the model formed with a ceramic powder composition, heat treating the coated model to remove the fugitive material and form a ceramic shell mold by sintering of the ceramic powder composition, introducing a molten composition comprising silicon into the shell mold to obtain the coated part in the shell mold, the molten composition infiltrating the porosity of the porous preform to form the ceramic matrix and covering the outer surface to form the bonding layer, ceramic and/or carbon particles being present in the porosity of the porous preform, and separating the shell mold from the coated part obtained, and forming a protective coating on the bonding layer.

7. The process as claimed in claim 6, wherein the ceramic powder composition comprises: a mullite powder, a silicon carbide powder, a silicon nitride powder, a boron nitride powder, or a mixture of thereof.

8. The process as claimed in claim 6, wherein the thickness of the fugitive material layer in the model is greater than or equal to 10 µm, said thickness being measured at and from a highest peak of surface undulations of the porous preform.

9. The process as claimed in claim 6, wherein the fugitive material is a wax or a resin.

10. The process as claimed in claim 6, wherein the porous preform is a woven fibrous preform obtained by three-dimensional weaving.

11. The process as claimed in claim 6, wherein the porous preform is partially densified by a ceramic matrix phase.

12. The process as claimed in claim 6, wherein the coated part is a turbomachine part.

13. The process as claimed in claim 6, wherein the protective coating is an environmental barrier.

* * * * *